Figure 1:
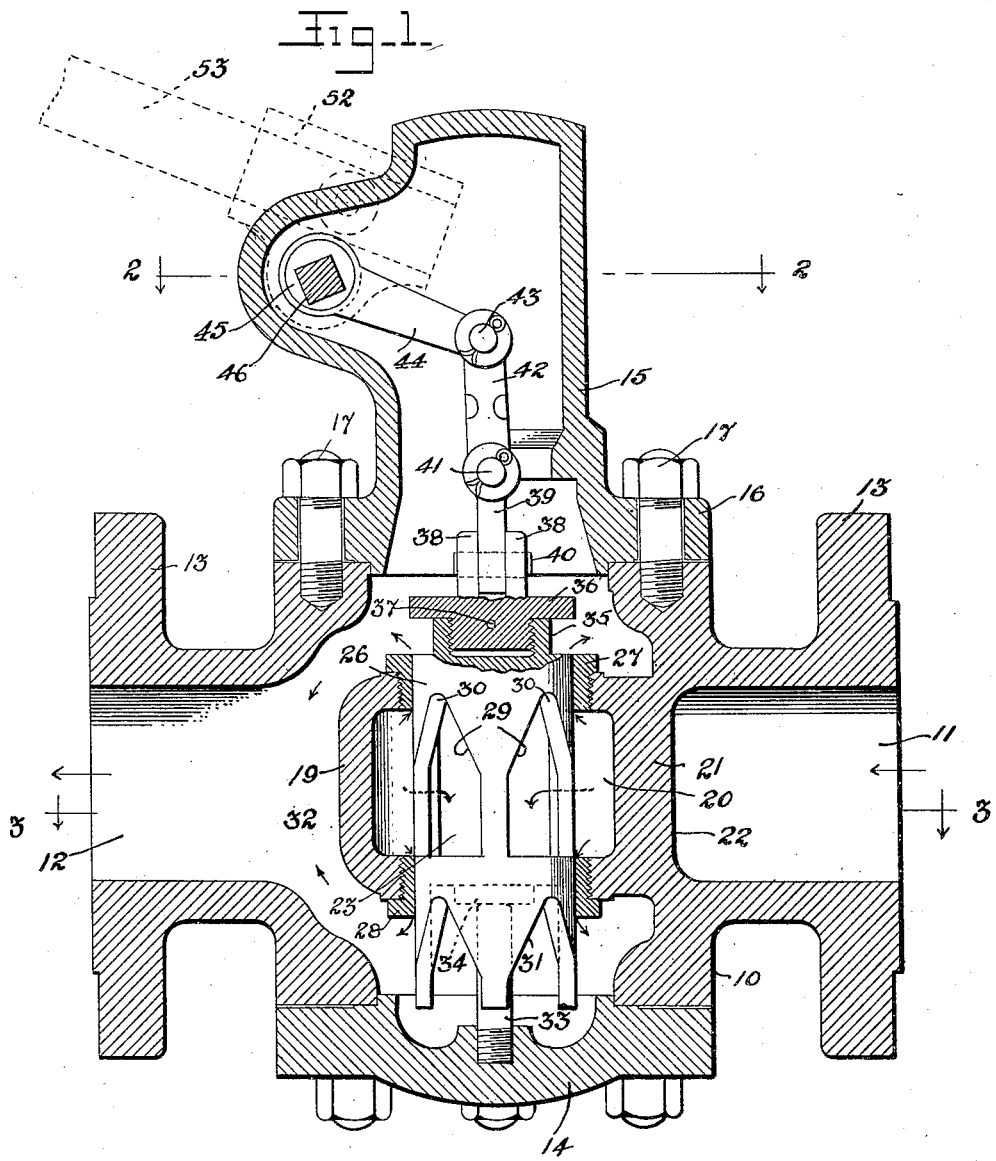

March 21, 1933.  R. L. MURRAY  1,902,336
BALANCED VALVE
Filed Nov. 25, 1930  2 Sheets-Sheet 1

WITNESS:

INVENTOR
Ralph L. Murray
BY
Joshua R. H. Potts
HIS ATTORNEY

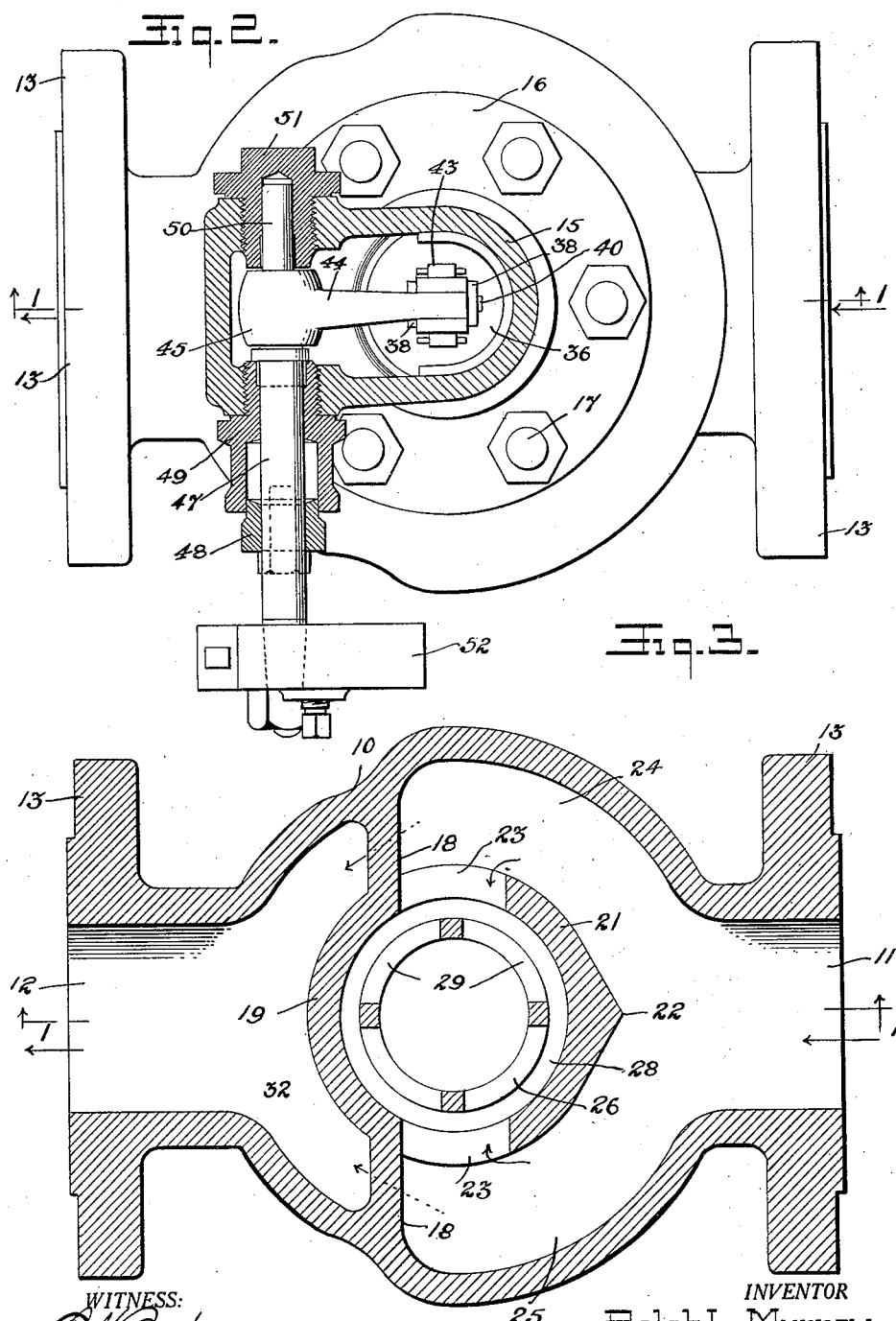

Patented Mar. 21, 1933

1,902,336

UNITED STATES PATENT OFFICE

RALPH L. MURRAY, OF PHILADELPHIA, PENNSYLVANIA

BALANCED VALVE

Application filed November 25, 1930. Serial No. 497,972.

This invention relates to valves, and has for an object to provide a valve balanced in a new and improved manner.

A further object of the invention is to provide a valve organization, having a valve member slidable therein, and subjected to the incoming fluid upon oppositely positioned sides, and to the outflowing fluid upon oppositely positioned ends, to completely balance the valve member.

It is well known, that in the distribution of fluids, under high tension and velocity, the valves are subjected to great stress by reason of the pressure and impact of the fluid on the presented parts, and especially upon the movable valve member. It is customary to present the incoming fluid to one side of the valve member, and when the valve is balanced, in regard to longitudinal movement of the valve member, it is not equally balanced in regard to side pressure. The present invention involves a valve housing, having an inner chamber, through which the valve member slides, and into which the incoming fluid is introduced upon diametrically opposite sides of the valve member, so that the said valve member is equally subjected to the impact and pressure of the incoming fluid upon opposite sides, and balanced, and passing through openings in the valve member to balance the pressure at opposite ends, so that irrespective of the tension or velocity of the fluid, the valve member will always move unimpeded.

The invention further involves the production of improved mechanical means for actuating the valve member.

The invention is directed to other objects and possesses other features of novelty and advantage, some of which, together with the foregoing, will be hereinafter more fully set forth.

In the drawings:—

Figure 1 is a sectional view taken diametrically through the inlet and outlet ports, and on a plane which would be substantially vertical as a valve is ordinarily mounted, Figure 2 is a transverse sectional view, taken on line 2—2 of Figure 1, and Figure 3 is a transverse sectional view, taken on line 3—3 of Figure 1, both Figures 2 and 3 showing the section lines of Figure 1.

Like characters of reference indicate corresponding parts throughout the several views.

The improved valve, which forms the subject matter of this application, is particularly designed for large installations, carrying great volumes of fluid under high pressure, and at great velocity. It is, of course, not limited in its utility to any sizes, and will include the smaller sizes.

The organization comprises a housing 10, having an inlet port 11, and an outlet port 12, with the usual flanges 13 for connection with abutting conduits.

The housing 10, normally open at the bottom, is provided with a cap 14 which is secured thereto in any usual and ordinary manner, and with a dome 15. The dome 15 is preferably provided with a flange 16, which is secured to the housing by bolts 17, or their equivalents.

Within the housing, a partition 18 is erected, bowed as at 19 to form one side of an internal chamber 20, the opposite side of which is provided by a baffle 21, preferably having a pointed extremity 22 extending diametrically of the inlet port 11. This chamber 20, communicates through the port 23, with branches 24 and 25 of the inlet passage, so that the fluid incoming through the inlet port 11, is divided by a baffle 22, and enters through the ports 23, to the chamber 20.

The chamber 20 is open at the top and bottom, and a valve member 26 is longitudinally slidable there-through. Preferably, bushings 27 and 28 are provided as seats for the valve 26. The valve 26, is, in the main, cylindrical, or terete, and is provided with openings 29 which are provided at their upper ends with converging sides, forming points 30.

Below the lower bushing 28, similar passages are provided by the converging side walls 31. As the valve is raised, therefore, fluid will pass from the chamber, through the openings in the valve, and will be discharged through the uncovered angular openings at the top of the valve, and will also flow through similarly uncovered angular openings at the bottom of the valve, and in both instances, will pass into the chamber 23 which is in communication with, and a part of the outlet port 12.

The cap 14 is provided with a pin 33, upstanding therefrom, and in position to engage adjustably against the bottom of the valve 28 in its lowermost position, the valve being preferably provided with a boss 34, cast integral therewith for engagement upon the top of the pin.

At its upper end, the valve member 28 is provided with a sleeve 35 which is internally screw threaded, and a nut 36 engaged therein and is held from rotation, when seated, by the diametrical pin 37. This nut 37 carries upstanding spaced ears 38, between which a link 39 is pivoted by the pin 40. This link 39 is pivoted at 41 to a link 42, the pintle 41 being at right angles to the pintle 40. The link 42 is pivoted at 43 to an arm 44, which arm is provided with a hub 45, and is seated upon the squared part 46, of the shaft 47.

The shaft 47 extends through a gland 48, carried by a nut 49, and has a reduced part 50, fulcrumed in a nut 51. The nuts 49 and 51 are similarly threaded, and adapted for interchange, so that the end of the shaft 50 may extend in either direction according to the way it is mounted, and the convenience and requirements of use. The shaft 47 is provided with a socket 52, into which a handle, or lever 53, may be introduced for actuating the valve.

It has been the experience of makers and users of valves for like purposes, that the excessive pressure and velocity of the fluids, controlled by such valves, when impinging against the valve member, causes a rapid rotation of the valve member within the housing, and this wears the contacting parts so that it readily and quickly becomes useless. The present invention provides for retaining the valve member against rotation by the use of the links 42 and 39, the valve being fulcrumed to the link 39 at right angles to the fulcrum between the links 39 and 42 to form substantially a universal joint, but at the same time, prevent a rotation of the valve by reason of the pin 37, securing the nut 36, to the sleeve 35.

It is believed, that the utility, installation and operation of the device will be fully understood from the foregoing description, and the several suggestions of use already included therein.

Of course, the invention herein illustrated, may be modified in various ways without departing from the invention herein set forth and hereinafter claimed.

The invention is hereby claimed as follows:—

A valve organization comprising a housing, a valve mounted to reciprocate therein, a shaft extending through the housing, an arm on the shaft within the housing, links from the arm to the valve interconnected by a pintle, and a pintle perpendicular to the first mentioned pintle pivoting the terminal link to the valve, said links and pintles forming substantially a universal joint between the arm and valve.

In testimony whereof I have signed my name to this specification.

RALPH L. MURRAY.